US009710056B2

(12) United States Patent
Johnson et al.

(10) Patent No.: US 9,710,056 B2
(45) Date of Patent: Jul. 18, 2017

(54) METHODS AND SYSTEMS FOR CORRELATING MOVEMENT OF A DEVICE WITH STATE CHANGES OF THE DEVICE

(75) Inventors: Michael Patrick Johnson, Sunnyvale, CA (US); Steve Lee, San Francisco, CA (US); Mat Balez, San Francisco, CA (US); Nirmal Patel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1093 days.

(21) Appl. No.: 13/425,739

(22) Filed: Mar. 21, 2012

(65) Prior Publication Data

US 2013/0254525 A1    Sep. 26, 2013

(51) Int. Cl.
G06F 9/06 (2006.01)
G02B 27/01 (2006.01)
G06F 3/01 (2006.01)

(52) U.S. Cl.
CPC ........... *G06F 3/012* (2013.01); *G02B 27/017* (2013.01); *G02B 27/0172* (2013.01); *G06F 3/016* (2013.01); *G02B 2027/014* (2013.01); *G02B 2027/0178* (2013.01); *G02B 2027/0187* (2013.01)

(58) Field of Classification Search
CPC ................ G06F 3/012; G02B 2027/0187
See application file for complete search history.

(56) References Cited

U.S. PATENT DOCUMENTS

| 6,184,847 B1 | 2/2001 | Fateh et al. |
| 6,730,047 B2 | 5/2004 | Socci et al. |
| 8,976,063 B1 * | 3/2015 | Hawkins et al. ........ 342/357.32 |
| 8,996,332 B2 * | 3/2015 | Kahn et al. .................... 702/141 |
| 2004/0225236 A1 | 11/2004 | Wheeler et al. |
| 2005/0212911 A1 * | 9/2005 | Marvit .................... G06F 3/017 348/154 |

(Continued)

FOREIGN PATENT DOCUMENTS

WO    2011044680 A1    4/2011

OTHER PUBLICATIONS

Thiagarajan et al. (Cooperative Transit Tracking using Smartphones, University of Illinois at Chicago, 2010, pp. 85-98).*

(Continued)

*Primary Examiner* — Regis Betsch
*Assistant Examiner* — Lisa Peters
(74) *Attorney, Agent, or Firm* — McDonnell Boehnen Hulbert & Berghoff LLP

(57) ABSTRACT

The present description discloses systems and methods for changing the state of a device. One embodiment may include a device configured to provide a device in a first state, receive a signal indicative of first angular data of the device, and compare the first angular data to a first threshold. The device may then execute instructions to initiate a timer when the first angular data is greater than the first threshold, receive a signal indicative of a second angular data of the device, and compare the second angular data to a second threshold. When the second angular data is less than the second threshold and the time passed is within a predetermined time period, the device may execute instructions to transition the device to a second state.

19 Claims, 7 Drawing Sheets

(56) References Cited

U.S. PATENT DOCUMENTS

| | | | |
|---|---|---|---|
| 2005/0216867 A1* | 9/2005 | Marvit | G06F 1/1613 |
| | | | 715/863 |
| 2006/0017657 A1 | 1/2006 | Yamasaki | |
| 2006/0282021 A1* | 12/2006 | DeVaul | A61B 5/0024 |
| | | | 600/595 |
| 2008/0074442 A1 | 3/2008 | Taniguchi et al. | |
| 2009/0241072 A1* | 9/2009 | Chaudhri | G06F 3/04883 |
| | | | 715/863 |
| 2010/0259471 A1 | 10/2010 | Takano et al. | |
| 2010/0315329 A1* | 12/2010 | Previc | G06F 3/012 |
| | | | 345/156 |
| 2011/0227812 A1 | 9/2011 | Haddick et al. | |
| 2012/0313848 A1* | 12/2012 | Galor et al. | 345/156 |
| 2013/0044043 A1* | 2/2013 | Abdollahi | A42B 3/0433 |
| | | | 345/8 |

OTHER PUBLICATIONS

Levy (Pinkbike, Interbike 2010—4iiii Heads Up Eyewear Display, Sep. 28, 2010).*

International Search Report for PCT/US2013/033215 mailed Jul. 31, 2013.

T. Starner, The Challenges of Wearable Computing: Part 2, IEEE Micro, Jul./Aug. 2001, vol. 21, Issue 4, pp. 54-67.

Ozan Cakmakci et al., Head-Worn Displays: A Review, Journal of Display Technology, Sep. 2006, vol. 2, No. 3, pp. 199-215.

Ho-Sub Yoon et al., Human Computer Interface for Gesture-Based Editing System, International Conference on Image Analysis and Processing, 1999, Venice, pp. 969-974.

EE Sian Neo et al., Whole-Body Motion Generation Integrating Operator's Intention and Robot's Autonomy in Controlling Humanoid Robots, IEEE Transactions on Robotics, Aug. 2007, vol. 23, No. 4, pp. 763-775.

\* cited by examiner

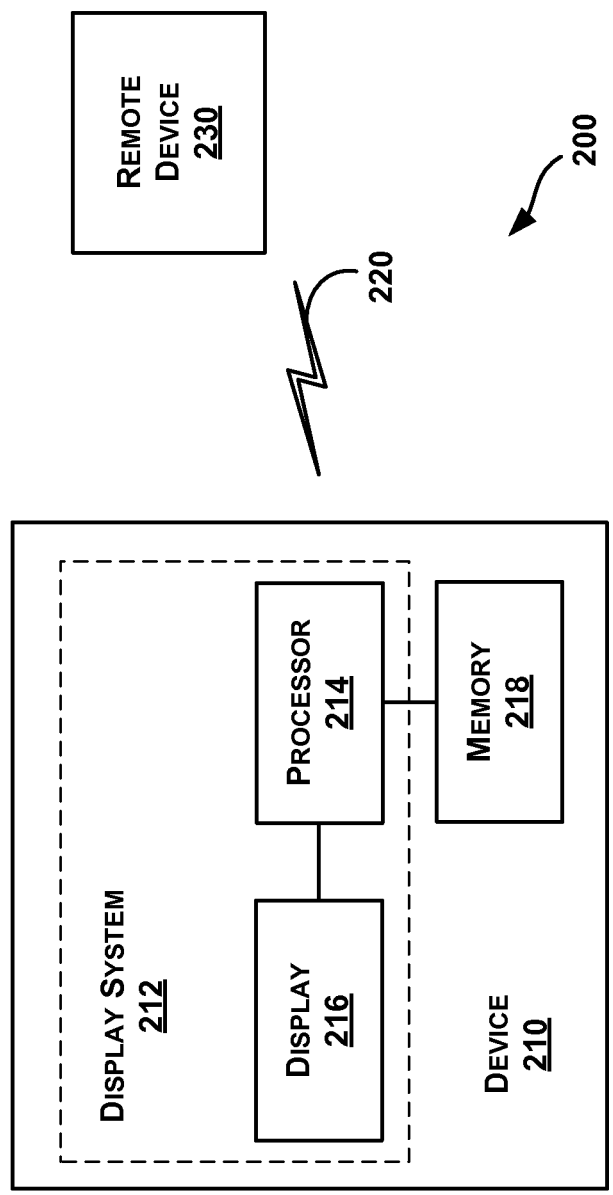

METHODS AND SYSTEMS FOR CORRELATING MOVEMENT OF A DEVICE WITH STATE CHANGES OF THE DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called a head-mountable device or a "head-mounted display". A head-mountable device places a graphic display or displays close to one or both eyes of a wearer. To generate the images on a display, a computer processing system may be used. Such displays may occupy a wearer's entire field of view, or only occupy part of wearer's field of view. Further, head-mountable devices may be as small as a pair of glasses or as large as a helmet.

A head-mountable device may provide a graphic display and may be directed to transition from one state to another, such as to transition from and "on" state to an "off" state.

SUMMARY

The present application discloses, inter alia, systems and methods for correlating device movement with device state changes.

In one embodiment, a method for changing the state of a device is provided. The method comprises providing a device in a first state and receiving a signal indicative of first angular data of the device. The method then comprises when the first angular data is greater than a first threshold, causing the device to transition to a second state when a signal indicative of second angular data of the device is received prior to expiration of a time period and the second angular data is less than a second threshold, wherein the time period is based on receipt of the signal indicative of the first angular data of the device.

In another embodiment, an article of manufacture is provided. The article includes a tangible computer-readable media having computer-readable instructions encoded thereon. The instructions comprise providing a device in a first state, and receiving a signal indicative of first angular data of the device. The instructions then comprise when the first angular data is greater than a first threshold, causing the interface to transition to a second state when a signal indicative of second angular data of the device is received prior to expiration of a time period and the second angular data is less than a second threshold, wherein the time period is based on receipt of the signal indicative of the first angular data of the device.

In yet another embodiment, a system is provided. The system comprises a processor, at least one sensor, data storage, and machine language instructions stored on the data storage executable by the processor. The machine language instructions are configured to provide a device in a first state, and receive a signal indicative of first angular data of the device. The instructions then comprise when the first angular data is greater than a first threshold, causing the device to transition to a second state when a signal indicative of second angular data of the device is received prior to expiration of a time period and the second angular data is less than a second threshold, wherein the time period is based on receipt of the signal indicative of the first angular data of the device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 2 illustrates a schematic drawing of a computing device according to an example embodiment.

DETAILED DESCRIPTION

I. Overview

In some examples, hands-free access to a device may be provided using sensor detection. A sensor may determine and transmit a signal of an angle with respect to a reference point or an angular velocity of the device as the device moves, and the transmitted signals may then be compared to pre-determined threshold values in a finite state machine system. If a transmitted angle or angular velocity is greater than a first threshold value, the system may be configured to move to the next state. At the next state, when a transmitted angle or angular velocity is less than a second threshold value in a second direction, the system executes instructions to proceed to a third state, at which point the system executes instructions to change the state of the interface.

II. Example Wearable Computing Devices

Systems and devices in which example embodiments may be implemented will now be described in greater detail. In general, an example system may be implemented in or may take the form of a wearable computer. However, an example system may also be implemented in or take the form of other devices, such as a mobile phone, among others. Further, an example system may take the form of non-transitory computer readable medium, which has program instructions stored thereon that are executable by at a processor to provide the functionality described herein. An example, system may also take the form of a device such as a wearable computer or mobile phone, or a subsystem of such a device, which includes such a non-transitory computer readable medium having such program instructions stored thereon.

Figure 1A:
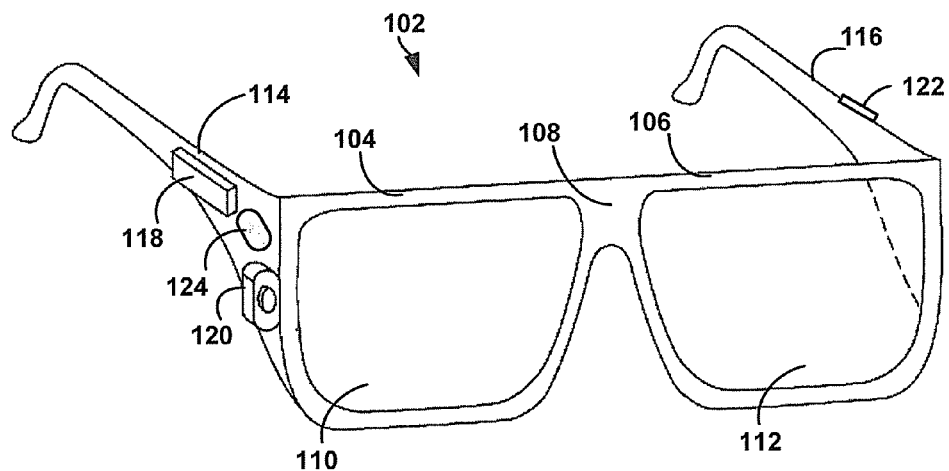
FIG. 1A illustrates a wearable computing system according to an example embodiment.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. Further, unless specifically noted, it will be understood that the systems, devices, and methods disclosed herein are not functionally limited by whether or not the head-mountable device 102 is being worn. As illustrated in FIG. 1A, the head-mountable device 102 comprises frame elements including lens-frames 104, 106 and a center frame support 108, lens elements 110, 112, and extending side-arms 114, 116. The center frame support 108 and the extending side-arms 114, 116 are configured to secure the head-mountable device 102 to the face of a user via the nose and ears of the user, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind the ears of a user to secure the head-mountable device 102 to the user. The extending side-arms 114, 116 may further secure the head-mountable device 102 to the user by extending around a rear portion of the head of the user. Additionally or alternatively, for example, the HMD 102 may connect to or be affixed within a head-mountable helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102).

The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the finger of the user reaches the edge, or other area, of the finger-operable touch pad 124. If more than one finger-operable touch pad is present, each finger-operable touch pad may be operated independently, and may provide a different function.

Figure 1B:
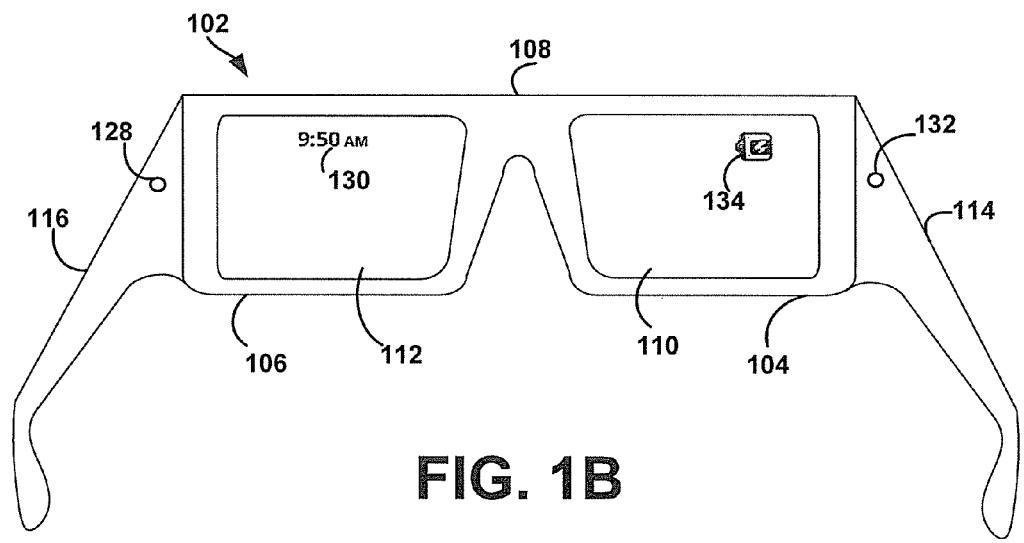
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The head-mountable device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the eyes of the user, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
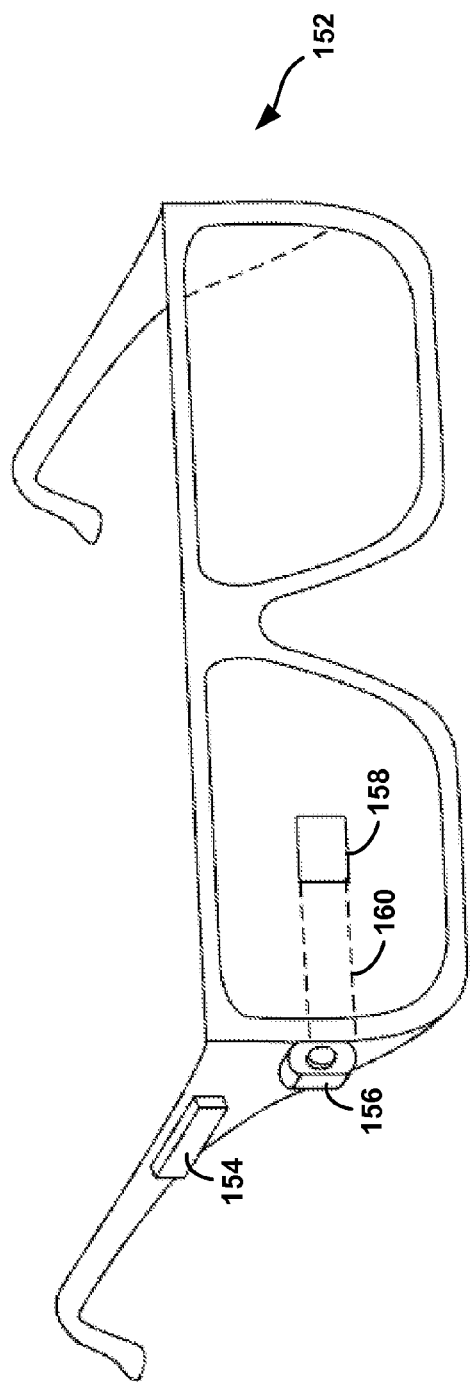
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
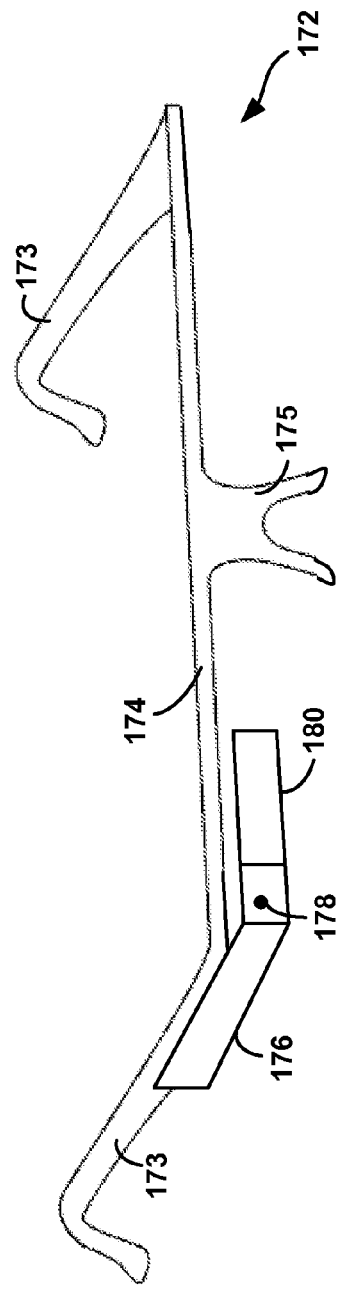
FIG. 1D illustrates another wearable computing system according to an example embodiment.

FIG. 1D illustrates another wearable computing system according to an example embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the view of the physical world. In one example, the single lens element 180 may be coupled to the inner side (i.e., the side exposed to a portion of a head of a user when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

FIG. 2 illustrates a schematic drawing of a computing device according to an example embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mountable devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Embodiments of Display Methods

Figure 3:
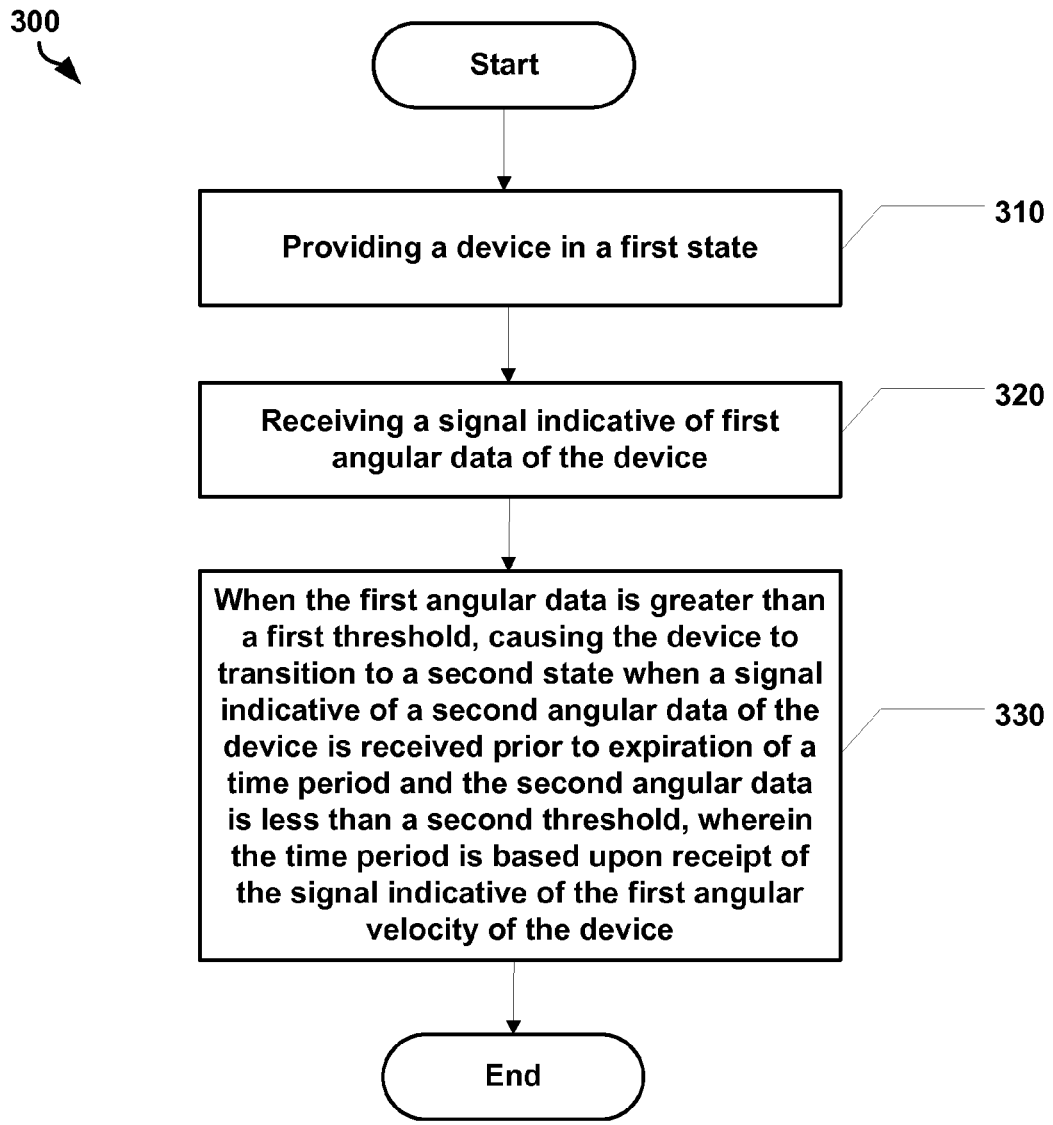
FIG. 3 is a flowchart of an example method for changing the state of a device.

FIG. 3 is a flowchart of an illustrative method 300 for changing the state of a device, in accordance with one aspect of the present application. Method 300 presents an embodiment of a method that, for example, could be used with systems 100 and 150. Method 300 may include one or more operations, functions, or actions as illustrated by one or more of blocks 310-330. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Initially, the method 300 includes providing a device in a first state, at block 310. The device may be mounted on the user's head in a variety of configurations, and may be part of a device as previously described with reference to FIGS. 1A-2. In one example embodiment, an interface on the device is turned off in the first state. In another example embodiment, the device interface is turned on in the first state. In yet another example embodiment, the device is in a sleep or hibernate mode in the first state, wherein the interface or the display is off but the device is not fully shut down. In another embodiment, the central processing unit (CPU) and/or other subsystems of the device are turned off in the first state, while sensors or a microcontroller chip, for example, remain on. In another embodiment, the CPU and/or other subsystems of the device are turned on in the first state. Thus, references to the state of the device may refer to the state of portions of the device.

The method 300 includes receiving a signal indicative of first angular data of the device, at block 320. A computing device, such as the computing devices 102 or 152 of FIGS. 1A-D, for example, may receive the signal indicative of the first angular data. The device may be mounted on a user's head in a variety of configurations.

The signal may be received from a sensor that is configured to determine the angular velocity of the device as the device moves. The sensor may be a three-axis gyroscope, which may be part of the device. In other example embodiments, other types of sensors may be used.

In one example embodiment, the first angular data may include the angular velocity. A gyroscope may measure device-relative angular velocity in radians per second, and movement along a single axis, such as the X-axis, may be taken as the component of angular velocity to be used. In one example, the sensor may be configured to determine a measurement on the X-axis of the angular velocity when the device moves up in the vertical direction; such as when a user moves his or her head up while the device is on the head of the user.

The device may be configured to account for the variance of data received from the sensor. In one example embodiment, a low-pass filter may be used to filter out movements that fall outside certain pre-set boundaries. In this example embodiment, the low-pass filter may allow lower frequencies of movement to pass through the filter, while filtering out frequencies that are above than a boundary value. The boundary value may be a higher frequency than a user wearing the device would purposefully make. For example, if a user is wearing the device on his or her head while the user is on a bus on a turbulent road, the head of the user may be quickly moving up and down due to the external turbulence. The frequencies of these quick up-and-down movements may be higher than the set boundary value, and may not pass through the low-pass filter. Thus, a low-pass filter may prevent false positives from proceeding to the comparison that will be described at block 330 below.

In one example embodiment, the sensor may allow all data through, and if the device detects a large variance of data received, the device may be configured to turn off the sensor. In another example embodiment, the device may require a stable signal before allowing the step at block 310 occur, that is, before allowing a first angular velocity to be recognized and executing instructions to proceed to the next step.

In another example embodiment, the first angular data may include data indicative of the angle of the device with respect to a reference point. In this embodiment, the data may be received from an accelerometer, or from both an accelerometer and a gyroscope via a sensor fusion system. The angle of the device with respect to a reference point may be taken as the absolute angle with respect to the Earth or to gravity on any of the three axes, otherwise known as roll, pitch, and yaw. In another example embodiment, the angle of the device with respect to a reference point may be taken as the angle with respect to a last-measured position of the device.

The method 300 includes when first angular data is greater than a first threshold, causing the device to transition to a second state when a signal indicative of a second angular data of the device is received prior to expiration of a time period and the second angular data is less than a second threshold, wherein the time period is based on receipt of the signal indicative of the first angular data of the device, at block 330.

A plurality of threshold values may be stored in the processor of the device, and a particular threshold value may be stored for comparison with the first angular data. In one example embodiment, a first threshold value may be an angular velocity of about 1 radian per second.

The second angular data may be taken, similarly as the first angular data is taken, from movement of the device. In one example, the sensor may be configured to determine a measurement of the angular velocity when the user moves his or her head down in the vertical direction. The device may require a stable signal before the second angular velocity is recognized and the device executes instructions to proceed to cause the device to transition to a second state. A low-pass filter as previously described may be used to filter out movements that fall above a pre-set boundary.

A processor within the computing device may be configured to process the angular data and perform the comparison. In one example embodiment, a second threshold value may be about −0.5 radians per second. In another example embodiment, the second threshold value may be determined as a negative fraction of the first threshold value.

A user may configure the device to comprise threshold values according to the preferences of the user. In one example embodiment, the device may comprise a settings function where a user may select from options indicating "liberal," "moderate," or "conservative" thresholds, allowing the device to then select according thresholds for comparison at block 330. In another example embodiment, a user may select specific values to be applied as the first and the second thresholds.

In one example, the time period may be pre-set or pre-determined, and may be set to be about 750 milliseconds (ms). The time period may include the completion of the movements that comprise both the first and second angular velocities. In other examples, the time period may be set to be in the range of 500 ms to 1 second. The processor may be configured to execute instructions to cause the device to transition to the second state. Further, when the first angular velocity is greater than the first threshold, the processor may responsively execute instructions to cause a timer to turn on to initiate the pre-determined time period.

In one example, the microcontroller, field-programmable gate array, and/or sensor hardware may be used to run the sequence indicated by blocks 310-330 while the device is operating in a low power mode. In this example, the CPU may be turned off. At block 330, the transition to the second state may include turning on the CPU and the display. Alternatively, the transition to the second state may include turning the CPU and the display off.

Thus, the movement of a device worn by a user as the user moves his or her head within a window of time may be used to change the state of a device or a component of the device.

Figure 4:
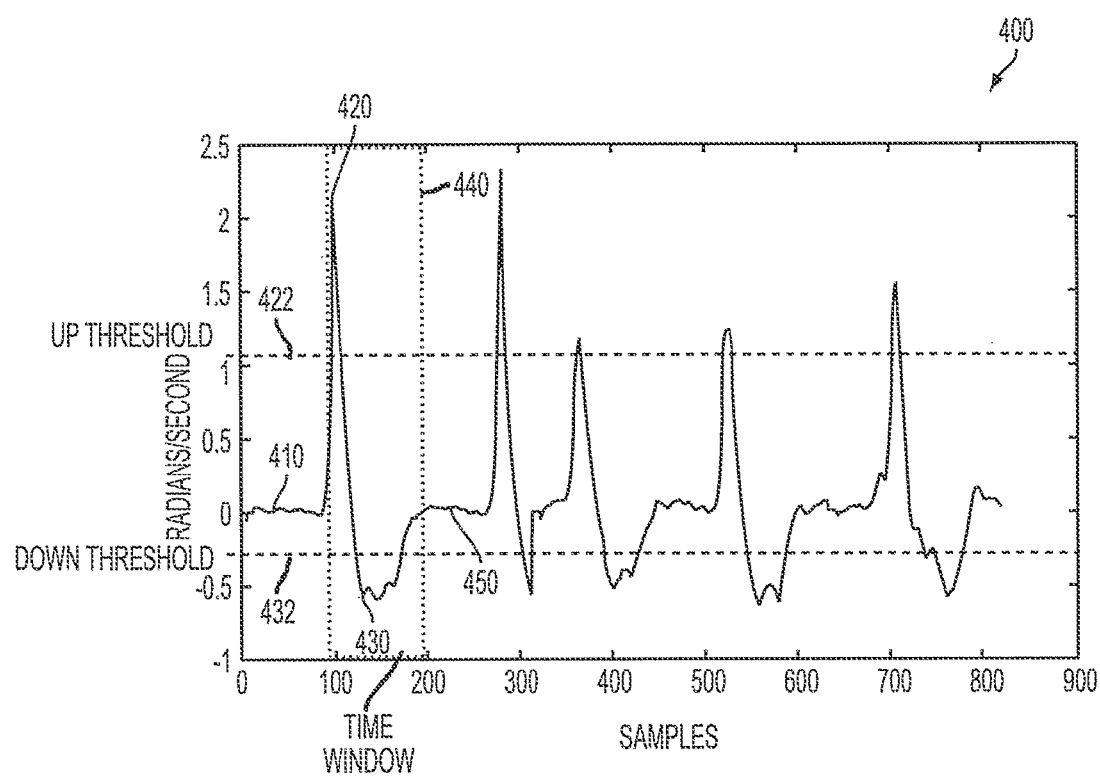
FIG. 4 is an example graph illustrating a range of movement of a device over a period of time.

FIG. 4 is an example graph 400 illustrating an example range of movement of a device over a period of time. The device may be a computing device, such as the computing devices 102 or 152 of FIGS. 1A-D, for example, that carries out the method described with reference to FIG. 3.

As shown in graph 400, a period of time of relatively stable head movement is depicted from 0-100 samples on a sensor running at about 100 hertz, wherein the 100 samples comprise one second, at 410. At about 100 samples, the device moves upward quickly, at a rate of about 2 radians per second, at 420. The device may be worn by a user and the upward motion may be due to the user moving his or her head up. In the example illustrated in FIG. 4, an "up threshold" 422 is about 1.1 radians per second, shown by line 422. The up threshold 422 may correspond to the first threshold value described with reference to block 330 of FIG. 3.

The device then makes a downward motion that is a slower movement than the upward motion, to about −0.6 radians per second, shown at 430. In the example illustrated in FIG. 4, a "down threshold" 432 for the downward motion is about −0.25 radians per second. The down threshold 432 corresponds to the second threshold described with reference to block 330 of FIG. 3.

As shown in FIG. 4, once the device passes the up threshold 422, a timer is initiated to create a time window, shown by box 440, and described above with reference to block 330 of FIG. 3. In FIG. 4, the time window begins at about 100 samples and is set to expire at about 200 samples.

After the downward motion at 430, the device moves upward to return to the prior stable position, which may be a neutral head position when the device is on the head of a user, and is shown at 450.

In FIG. 4, the upward motion exceeds the up threshold 422, the downward motion is less than the down threshold 432, and both the upward motion and the downward motion have occurred within the time window 440. Thus, if the steps of FIG. 3 were executed in the scenario depicted in FIG. 4, the device would responsively transition the interface to a second state, as described with reference to block 330.

In other example embodiments, if the angular data comprises angular velocity, the first angular velocity and the second angular velocity may comprise movements other than those described above; for example, the first angular velocity may comprise a downward or a sideward movement, and the second angular velocity may comprise an upward movement, a sideward movement, or a circular movement. Additionally, the first and second angular velocities may comprise two movements in the same direction. Additional angular velocities may be used as well. The device may not be a head-mountable device but instead may be mountable on another body part, or may be a hand-held device.

In yet another example embodiment, the first threshold value may comprise a lower value than the second threshold value.

IV. Example Display of Items on a User Interface

Figure 5:
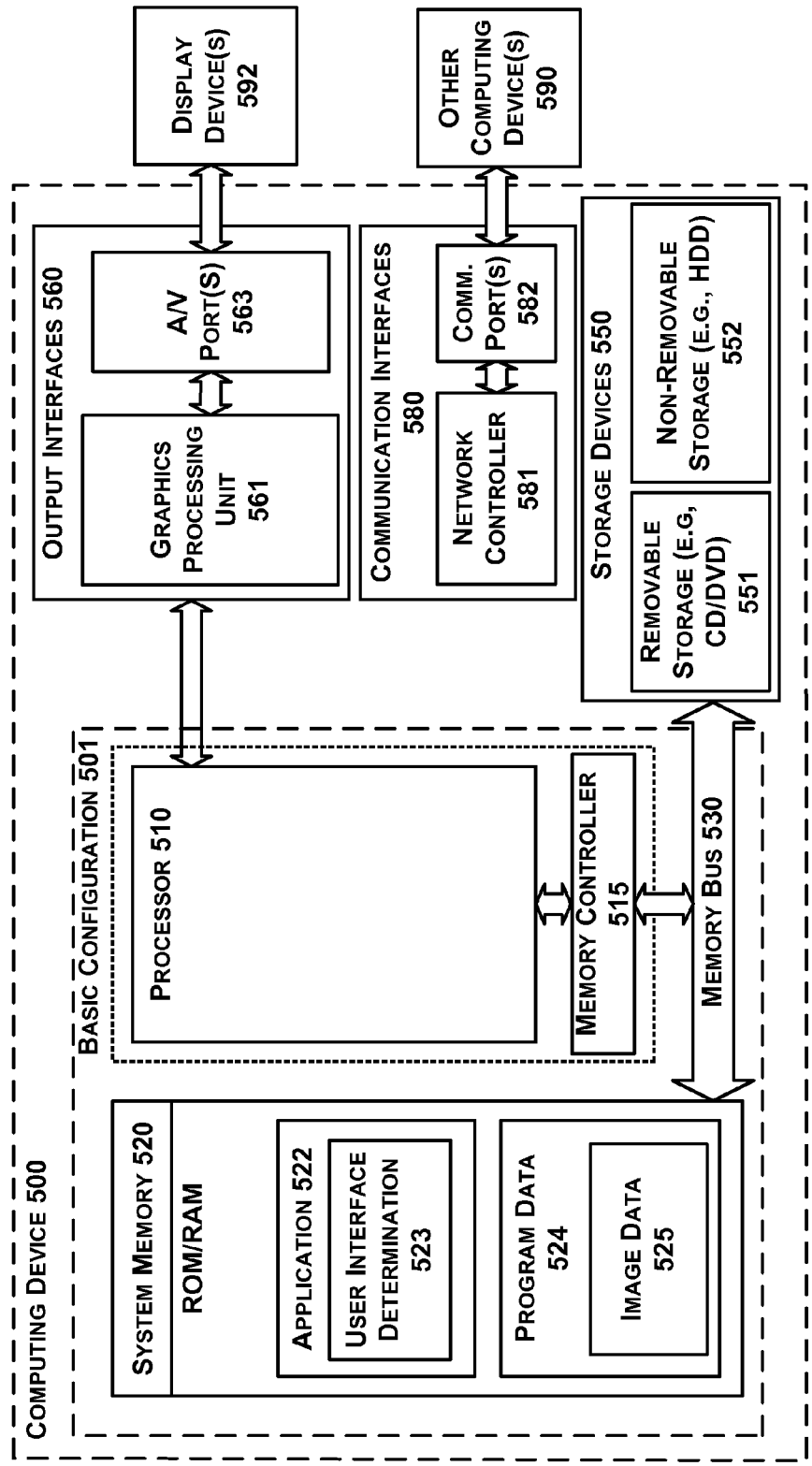
FIG. 5 is a functional block diagram illustrating an example computing device.

FIG. 5 is a functional block diagram illustrating an example computing device used in a computing system that is arranged in accordance with at least some embodiments described herein. The computing device may be a personal computer, mobile device, cellular phone, video game system, or global positioning system. In a very basic configuration 501, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes one or more applications 522, and program data 524. Application 522 may include a display determination 523 that is arranged to provide inputs to the electronic circuits, in accordance with the present disclosure. Program data 524 may include image data 525 that could provide image data to the electronic circuits. In some example embodiments, application 522 can be arranged to operate with program data 524 on an operating system 521. This described basic configuration is illustrated in FIG. 5 by those components within dashed line 501.

Computing device 500 can have additional features or functionality, and additional interfaces to facilitate communications between the basic configuration 501 and any devices and interfaces. For example, the data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and non-volatile, removable and non-removable media implemented in any method or technology for storage of information, such as computer readable instructions, data structures, program modules, or other data.

System memory 520, removable storage 551, and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 560 that may include a graphics processing unit 561, which can be configured to communicate to various external devices such as display devices 592 or speakers via one or more A/V ports 563 or a communication interface 580. A communication interface 580 may include a network controller 581, which can be arranged to facilitate communications with one or more other computing devices 590 over a network communication via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Figure 6:
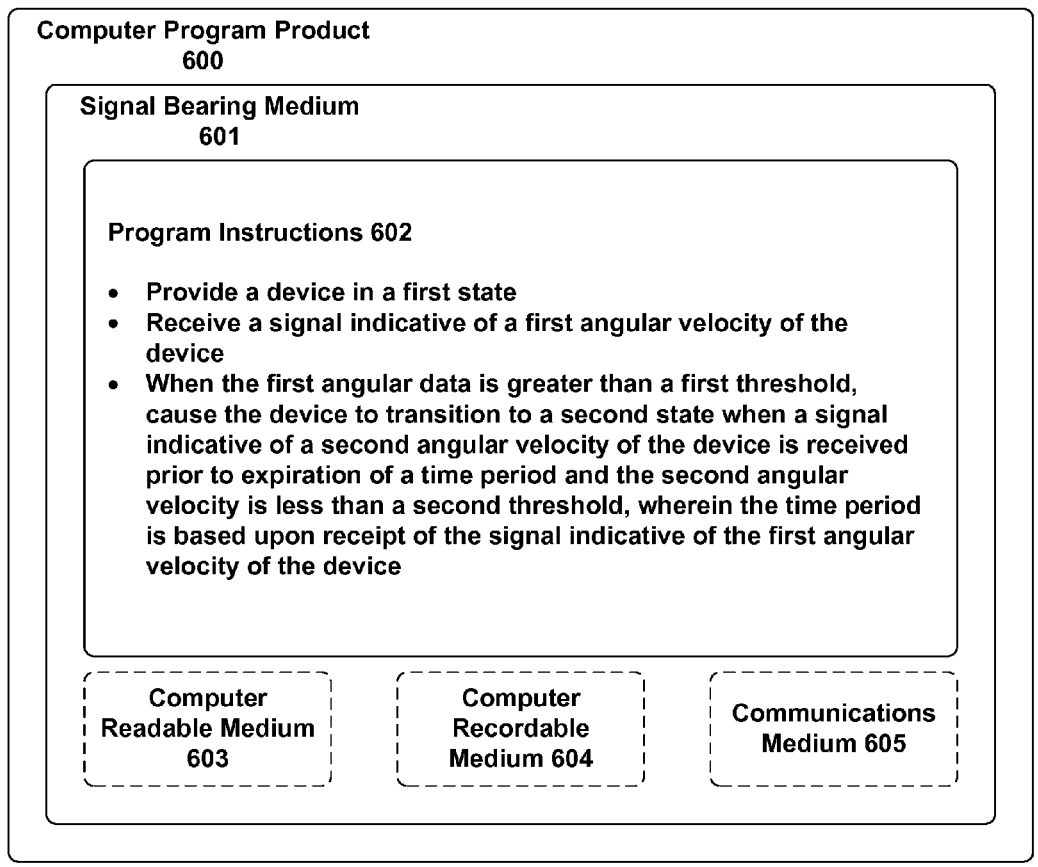
FIG. 6 is a schematic illustrating a conceptual partial view of an example computer program.

In some embodiments, the disclosed methods may be implemented as computer program instructions encoded on a computer-readable storage media in a machine-readable format. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1A-5. Thus, for example, referring the embodiment shown in FIG. 3, one or more features of blocks 310-330 may be undertaken by one or more instructions associated with the signal bearing medium 601.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

In some examples, the above-described embodiments enable a user to communicate hands-free with an interface, thus providing the user with the freedom of not juggling typing on a device with other tasks, as well as the ability to gather and communicate information in a more natural manner.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
   providing a wearable computing device in a first state;
   receiving a signal indicative of a first relative angular velocity of the wearable computing device;
   determining that the first relative angular velocity is greater than a first predetermined threshold value;
   upon determining that the first relative angular velocity is greater than the first predetermined threshold value, executing instructions to initiate a timer that expires after a predetermined period of time;
   prior to expiration of the timer, receiving a signal indicative of a second relative angular velocity of the wearable computing device;
   determining that the second relative angular velocity is less than a second predetermined threshold value; and responsively causing the wearable computing device to transition to a second state, wherein the time period is based on receipt of the signal indicative of the first relative angular velocity of the wearable computing device.

2. The method of claim 1, wherein in the first state an interface on the wearable computing device is locked, and wherein transitioning the wearable computing device to the second state comprises executing instructions to unlock the interface.

3. The method of claim 1, wherein the first state is a locked state, wherein the locked state comprises the wearable computing device configured to detect an upward movement, wherein the upward movement comprises the first relative angular velocity.

4. The method of claim 1, wherein when the first relative angular velocity is greater than the first threshold, the method further comprises transitioning the wearable computing device to a waiting for down state, wherein the waiting for down state comprises the wearable computing device executing instructions to detect a downward movement.

5. The method of claim 4, wherein the downward movement comprises the second relative angular velocity.

6. The method of claim 1, further comprising:
applying a low-pass filter to remove angular velocity values that are above a pre-determined value.

7. The method of claim 1, further comprising:
determining that the wearable computing device is stable prior to receiving the signal indicative of the first relative angular velocity.

8. The method of claim 1, further comprising:
causing the wearable computing device to produce a sound when the transition to the second state occurs.

9. The method of claim 1, wherein the first relative angular velocity and the second relative angular velocity each comprise values indicating velocity of the device relative to a reference point.

10. The method of claim 1, wherein the first relative angular velocity and the second relative angular velocity are each measured on an X-axis.

11. An article of manufacture including a tangible computer-readable media having computer-readable instructions encoded thereon, the instructions comprising:
providing a wearable computing device in a first state;
receiving, by the wearable computing device, a signal indicative of a first relative angular velocity of the device;
determining that the first relative angular velocity is greater than a first predetermined threshold value;
upon determining that the first relative angular velocity is greater than the first predetermined threshold value, executing instructions to initiate a timer that expires after a predetermined period of time;
prior to expiration of the timer, receiving a signal indicative of a second relative angular velocity of the wearable computing device;
determining that the second relative angular velocity is less than a second predetermined threshold value; and
responsively causing the wearable computing device to transition to a second state, wherein the time period is based on receipt of the signal indicative of the first relative angular velocity of the wearable computing device.

12. The article of manufacture of claim 11, wherein the article of manufacture is a head-mountable device (HMD).

13. The article of manufacture of claim 11, wherein the instructions further comprise instructions to turn an interface on the wearable computing device on when transitioning the wearable computing device to the second state.

14. The article of manufacture of claim 11, wherein the instructions further comprise instructions to determine that the wearable computing device is stable prior to receiving the signal indicative of the first relative angular velocity.

15. The article of manufacture of claim 11, wherein in the first state an interface of the wearable computing device is locked, and wherein transitioning the wearable computing device to the second state comprises executing instructions to unlock the interface.

16. A system comprising:
a processor;
at least one sensor;
data storage; and
machine language instructions stored on the data storage executable by the processor to perform functions including:
providing a wearable computing device in a first state;
receiving a signal indicative of a first relative angular velocity of the wearable computing device;
determining that the first relative angular velocity is greater than a first predetermined threshold value;
upon determining that the first relative angular velocity is greater than the first predetermined threshold value, executing instructions to initiate a timer that expires after a predetermined period of time;
prior to expiration of the timer, receiving a signal indicative of a second relative angular velocity of the wearable computing device;
determining that the second relative angular velocity is less than a second predetermined threshold value; and
responsively causing the wearable computing device to transition to a second state, wherein the time period is based on receipt of the signal indicative of the first relative angular velocity of the wearable computing device.

17. The system of claim 16, wherein in the first state an interface of the wearable computing device is locked, and wherein transitioning the wearable computing device to the second state comprises executing instructions to unlock the interface.

18. The method of claim 1, wherein the wearable computing device is a head-mountable device (HMD).

19. The system of claim 16, wherein the wearable computing device is a head-mountable device (HMD).

* * * * *